June 10, 1952     R. DÉTREZ     2,600,099
VALVE DEVICE
Filed Aug. 9, 1945     2 SHEETS—SHEET 1
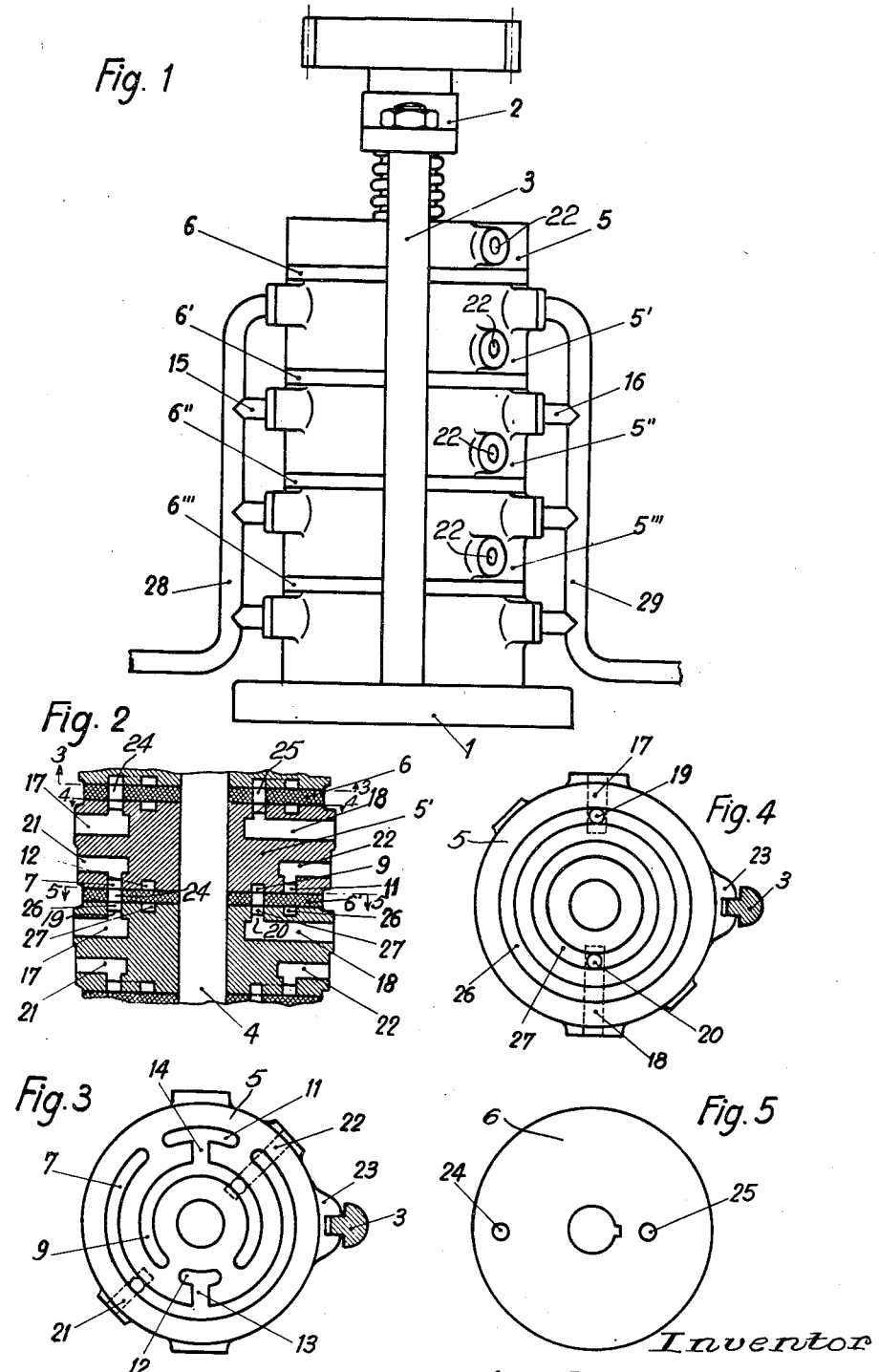

June 10, 1952     R. DÉTREZ     2,600,099
VALVE DEVICE
Filed Aug. 9, 1945     2 SHEETS—SHEET 2
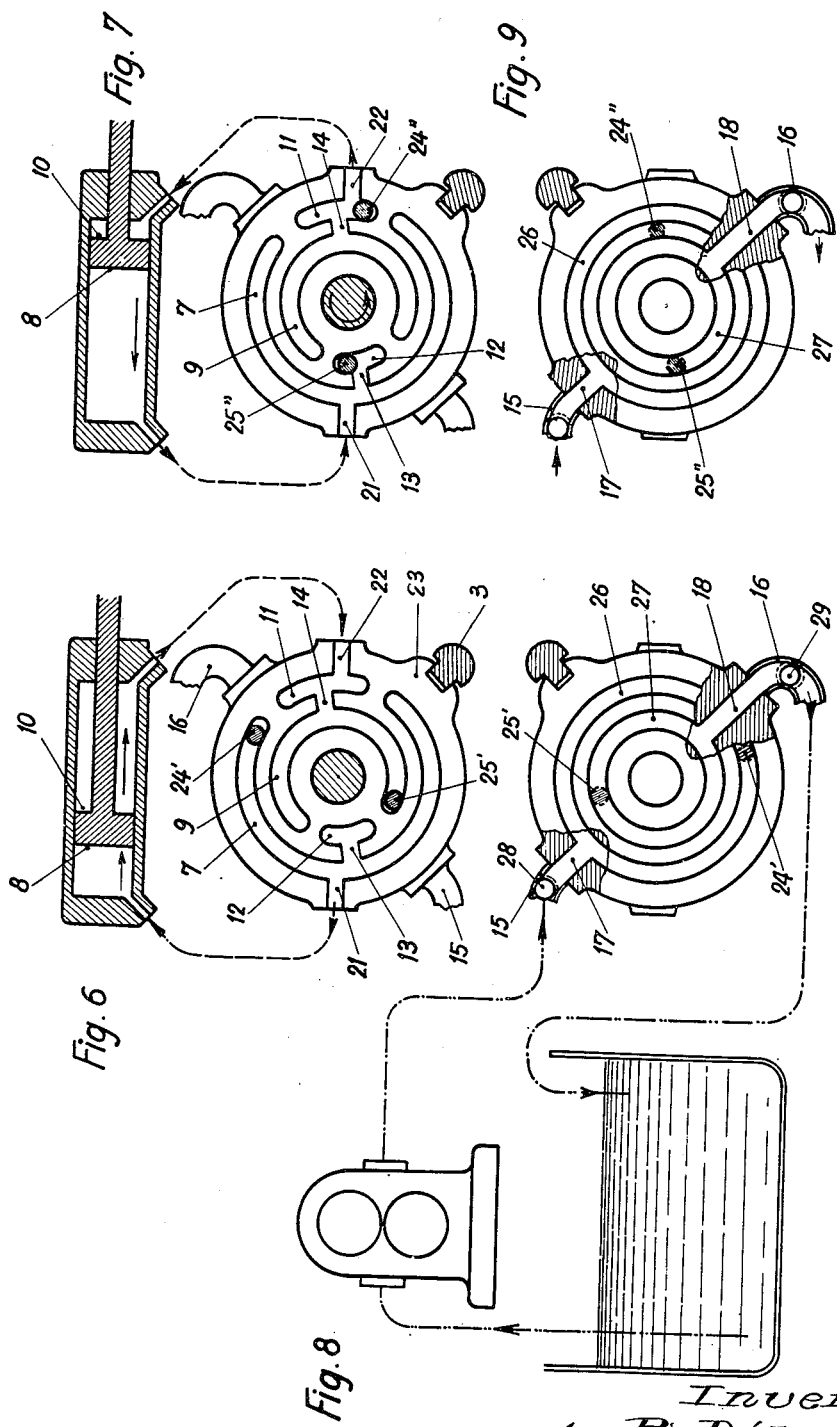

Patented June 10, 1952

2,600,099

UNITED STATES PATENT OFFICE 2,600,099

VALVE DEVICE

René Détrez, Nogent sur Marne, France

Application August 9, 1945, Serial No. 609,821
In France August 5, 1944

Section 1, Public Law 690, August 8, 1946
Patent expires August 5, 1964

6 Claims. (Cl. 251—87)

The present invention relates to valve devices or distributors for fluids under pressure for use in connection with apparatus or machines having movable parts to be operated by piston and cylinder devices of the servomotor type. The usual fluids used in the hydraulic system comprised by the valve device or distributor and the cylinder and piston devices are water, oil, or glycerin, etc. Such distributors are particularly intended for controlling the flow of fluid to and from hydraulic devices which require a low power but which operate at a high rate and it is very desirable that the operation of such devices be not affected by the wear on the movable parts of the distributor.

It is an object of the present invention to fulfill the above requirements by providing a valve device or a distributor including at least one series of superimposed discs through which a common shaft passes, each pair comprising a rotatable disc drivably connected to the shaft and a stationary disc freely receiving the shaft, the wear on the distributor being automatically taken up.

Another object of the present invention is to provide peripherally disposed inlets and outlets for the fluid or liquid in the stationary part of the valve device or distributor so as to avoid the use of stuffing boxes or the like.

A further object of the invention is to provide a valve device having rotatable discs of a very simple design.

Still other objects, advantages and improvements according to the invention will become apparent during the course of the following description.

On the accompanying drawings forming a part of this application and on which like reference numerals are employed to designate like parts throughout the same:

Figure 1 is an elevational external view showing the distributor according to the invention.

Figure 2 is a vertical sectional view showing a portion of each disc placed side by side, with the faces of each disc displaced angularly with respect to each other in order to show all connecting passages.

Figure 3 shows one of the faces of a non-rotary disc.

Figure 4 shows the other face of said disc.

Figure 5 shows one of the similar faces of a rotary disc.

Figure 6 shows, as viewed from the underside, the face of a non-rotary disc provided with the distributing passages, said disc being shown in the position in which it actuates a piston in its "outward" stroke.

Figure 7 shows a similar view but in the position in which the disc actuates the piston in its "return" stroke.

Figure 8 shows the same disc as Figure 6 but seen from the top side and in a fragmental sectional view so as to show the passage for feeding the liquid under pressure coming from the pump or from any other source of pressure, as also the passage for the discharge of the liquid forced back towards the tank receiving said returning liquid, and;

Figure 9 shows the same disc but in the position corresponding to Figure 7.

In said figures, reference numeral 1 designates the base of the distributor, 2 designates the upper cross-piece, 3 designates one of the columns connecting the cross-piece 2 with the base 1. The rotary shaft 4 is common to all the discs of a series; 5, 5', 5'' and 5''' are the non-rotary discs and 6, 6', 6'' and 6''' are the rotary discs.

In the non-rotary discs, 7 designates the passage for the distribution of the liquid under pressure towards one side 8 of the piston to be actuated, 9 designates the passage for the evacuation of the liquid discharged on the opposite side 10 of said piston; 11 designates the passage for the distribution of the liquid under pressure towards said side 10 of the piston under consideration and 12 designates the passage for the evacuation of the liquid discharged on the above mentioned side 8 of the actuated piston.

Numeral 13 designates a transversal passage putting both passages 7 and 12 into communication with each other and 14 designates a similar passage putting both passages 9 and 11 into communication with each other. The pipe 15 brings into the disc the liquid under pressure coming from the pump or any other source of pressure, and the pipe 16 brings to the return tank the liquid discharged by the above mentioned piston. The passages 17 and 18 correspond to said pipes respectively.

For a better understanding, the passages 17 and 18 are shown in Figures 8 and 9 in the same plane as the distributing passages while they lie, in Figure 2, below said distributing passages and communicate with the latter by means of perpendicular openings 19 and 20.

For the same reason, in Figures 6 and 7, the passages 21 and 22 which serve alternately as discharging passages for the liquid under pressure flowing towards the side of the piston to be actuated and as re-entering passages for the liquid discharged on this same side of the piston, have also been shown in the same plane as the distributing passages, while they lie, in Figure 2, above the latter. The passages 21 and 22 each receive conduits (Fig. 2), two conduits from each pair of passages extending respectively to one of four cylinders.

The non-rotary discs are held fast angularly through the fork 23 carried by each of them and between the prongs of which passes one of the columns 3.

In the rotary discs, 24 represents the communication opening for the liquid under pressure flowing from the upper face of a non-rotary disc to the lower face of the following non-rotary disc; 25 represents the communication opening for the liquid forced back by the corresponding actuated piston, said liquid being led to the return tank in the contrary direction, i. e. coming from the lower face of the non-rotary disc for entering the following non-rotary disc on the upper face of the latter.

In Figures 6 and 7, the hatched surfaces 24' and 25' as well as 24'' and 25'' respectively represent the projection of both said openings on the lower face of the non-rotary disc at the points corresponding to their position in the step which is mentioned by way of example.

On the face of the non-rotary disc opposed to that on which the distributing passages are provided, 26 is a continuous concentric passage receiving the liquid under pressure from the passage 17 and 27 is another continuous passage receiving the liquid discharged from the passages 9 and 12 and evacuating said liquid through the passage 18.

The pipes 15 for feeding the liquid under pressure can be connected with a general piping 28 supplying the non-rotary discs and the pipes 16 for the evacuation of the discharged liquid can also be connected with another general piping 29 collecting the discharged liquid for leading it to the return tank provided for said liquid.

The rotary shaft 4 rotates in the discs 5, 5', 5'' and 5''' without carrying them along, since the latter are held fast angularly through one of the columns 3, but said discs can slide axially on said rotary shaft.

Rotary discs 6, 6', 6'' and 6''' are driven by the keys carried by the shaft 4, but they can also slide axially on said shaft.

All these discs are maintained applied against one another as well as against their base 1 by known means such as elastic washers, springs or any other suitable pressure means resting against the last disc of the series.

The operation is as follows:

The general piping 28 brings the liquid under pressure to the distributor, said liquid entering each non-rotary disc through the pipe 15 and the passage 17. When leaving the passage 17, the liquid under pressure passes into the continuous concentric passage 26, then it leaves said first non-rotary disc for flowing into the nearest non-rotary disc which lies above it while flowing through the rotary disc inserted between both non-rotary discs under consideration.

During this travel the liquid leaves the concentric passage 26 for flowing through the communication opening 24 and finally arriving at the point 24' (Figure 6) into the passage 7 of the non-rotary disc which lies above the just mentioned non-rotary disc. Then the liquid under pressure entirely fills the passage 7 as well as the passage 12 which communicates with it through the transverse passage 13. As this liquid has no other issue than through the passage 21 it escapes through the latter for actuating the side 8 of the piston.

Simultaneously with the preceding steps and as soon as the thrust has begun to act on side 8 of the piston the side 10 of the latter forces back the liquid then which has actuated it. Said liquid leaves the cylinder for flowing towards the passage 22 whence it enters the passage 11 and then, through the medium of the transversal passage 14, the passage of evacuation 9.

It then leaves said passage through the communication opening 25 for flowing into the concentric passage 27 from which it will leave the distributor while flowing through the passage 18 and the pipe 16 which will bring it back to the return tank again through the general piping 29.

The thrust of the piston in the just mentioned direction will last until—owing to the movement of rotation of the shaft 4 and of the rotary discs carrying the communication openings 24 and 25—said openings have left the passages 7 and 9 and have come opposite the passages 11 and 12.

At this moment the flows of liquid will change their directions between the distributor and the piston to be actuated; this is represented in Figures 7 and 9 in which the actuated piston and the distributor are shown at the moment when the piston begins its return movement.

As a matter of fact, the liquid under pressure leaves the passage 26 for reaching the passage 11 while flowing through the communication 24 opening at the point 24'' in Figure 7. From this point, the liquid under pressure enters the passage 9 while flowing through the transversal passage 14, but since it has no other issue than the passage 22, it leaves through this latter and reaches the side 10 of the piston on which it exerts its pressure.

Simultaneously with the steps which have been just described for this change in the direction of the actuated piston and as soon as the thrust has begun to act on said piston, the side 8 of the latter forces back the liquid which has actuated it, which liquid re-enters the distributor through the passage 21 whence it enters the passage 7 and then, through the medium of the transversal passage 13, the passage of evacuation 12.

Then it leaves said passage 12 through the communication opening 25 for entering the concentric passage 27 from which it will leave the distributor while flowing through the passage 18 and the pipe 16 which brings it back to the return tank through the general piping 29.

The rotary shaft 4 receives a movement of rotation synchronized with the apparatus or apparatuses the movements of which are actuated by the different discs through which said shaft extends.

From the preceding explanation it will be seen that the liquid enters the distributor on the periphery of a non-rotary disc and leaves it on the periphery of one of the two nearest non-rotary discs, this latter lying above the first mentioned one in the selected example, a rotary disc being inserted between both above mentioned non-rotary discs and acting as a connection disc transmitting from the first to the second one the liquid under pressure flowing from the pump to the piston to be actuated and from the second to the first one the discharged liquid flowing from the piston under consideration to the return tank provided for said liquid.

This arrangement makes it possible to avoid bringing the liquid to the distributor in the central part of the latter and thus the necessity for stuffing boxes or similar gaskets.

On the other hand, the discs rest axially against one another and even, in the case of a substantial wear, the position of the communication passages or openings cannot be modified in any of the discs of the series, even after a long working of the apparatus.

In the selected example, the distribution passages have been provided on the lower face of the non-rotary discs and the concentric feeding passages on the upper face, but a reverse arrangement could be chosen as well. In such case, each non-rotary disc would be fed with liquid under pressure and with discharged liquid through the nearest non-rotary disc which lies above it instead of being fed through the underlying disc.

Of course, the profile and the development of the passages as well as their angular position with respect to each other or with respect to those of the other non-rotary discs are chosen according to the movements of the cylinders to be actuated and in each non-rotary disc they can be completely different from those of the other non-rotary discs. The same is true for the communication openings of the rotary discs, the cross-section and the position between one disc and the others.

When certain movements must have a slow evolution it is possible to combine the movements given by the distributor according to the invention with throttling valves.

The distributor shown in the appended drawings is provided with four pairs of discs but the invention can be applied to distributors with any number of discs feeding any number of cylinders to be actuated, whether said cylinders are in one and the same machine or in a plurality of machines actuated simultaneously through the device under consideration.

In the case of a large number of such cylinders to be controlled, the distributor may comprise a plurality of series of discs placed side by side, each one of said series of discs comprising its own rotary shaft. Likewise, the distributor can be placed in any suitable position, a horizontal or vertical or any other position.

It will be obvious that many variations and modifications may be resorted to by those skilled in the art without departing from the spirit of same as disclosed in the present application and the scope as defined by the appended claims.

What I claim is:

1. A valve device comprising rotatable and non-rotatable discs arranged in alternate superposed relation, a shaft passing axially through the several discs and having a driving connection with the rotatable discs, each two contiguous non-rotatable discs having in the adjacent faces thereof sets of arcuate passages and pairs of peripheral ports, the passages of one set being concentrically spaced apart and communicating respectively with the ports in the related disc, the rotatable disc disposed between said two non-rotatable discs being movable from a first fluid distributing and receiving position to a second fluid distributing and receiving position and having two ports respectively communicating with the passages of the first mentioned set, each passage of the other set communicating with one of the ports in the related non-rotatable discs and having two connected portions respectively disposed in position to communicate with the ports in a rotatable disc in both positions of the latter.

2. A valve device as claimed in claim 1 wherein the portions of each of the passages of the second mentioned set are concentrically arranged and connected intermediate their ends by a connecting passage disposed radially of the disc.

3. In a valve device, a series of distributing discs, juxtaposed in pairs and with each disc being in water tight contact along its plane faces with the adjacent discs, each pair including a rotatable disc and a non-rotatable disc, a common shaft extending through said discs, a driving connection between said shaft and the rotatable discs, means retaining the non-rotatable discs in fixed angular position, the several discs being movable axially with relation to said shaft, and resilient means positioned axially of the discs and exerting a force at right angles to the planes of the discs for maintaining the several discs in plane facial contact and in water tight relation.

4. A valve device for a liquid under pressure provided to actuate a hydraulic apparatus, comprising a plurality of rotatable and a plurality of non-rotatable discs arranged in alternate juxtaposed and water-tight relation, a shaft passing axially through, the several discs and having a driving connection with the rotatable discs, each non-rotatable disc having a peripheral inlet port and a peripheral outlet port for said liquid, and two peripheral ports adapted to work alternately, continuously as outlet and inlet port between the valve device and said hydraulic apparatus.

5. A valve device for a liquid under pressure provided to actuate a hydraulic apparatus, comprising a plurality of rotatable and a plurality of non-rotatable discs arranged in alternate juxtaposed, water-tight relation, a shaft passing axially through the several discs and having a driving connection with the rotatable discs, each rotatable disc being adapted to lead said liquid from a contiguous non-rotatable disc to the other contiguous non-rotatable disc, each non-rotatable disc having a peripheral inlet port and a peripheral outlet port for said liquid, and two peripheral ports adapted to work alternately, continuously as outlet and inlet port between the valve device and said hydraulic apparatus.

6. A valve device for a liquid under pressure provided to actuate a hydraulic reciprocating apparatus, comprising a plurality of rotatable and a plurality of non-rotatable distributing discs arranged in alternate juxtaposed water-tight relation; a shaft passing axially through the several discs and having a driving connection with the rotatable discs; each rotatable disc having two perforations therethrough; each non-rotatable disc having on one of its faces two concentric, uninterrupted passages, the first passage adapted to receive the liquid under pressure entered by the periphery of said disc and communicating with one of said perforations of one contiguous rotatable disc, the second passage communicating with the second perforation of said rotatable disc to receive the evacuated liquid coming from said hydraulic reciprocating apparatus; said non-rotatable disc having on its other face one arcuate passage to periodically connect one side of said hydraulic reciprocating apparatus with said liquid under pressure, one concentrically arranged arcuate passage to periodically connect the same side of said apparatus with the outlet and a radial passage connecting both said passages; said non-rotatable disc having on its same other face another arcuate passage to periodically connect the other side of said reciprocating apparatus with the liquid under pressure, one concentrically arranged arcuate passage to periodically connect the same other side of said apparatus with the outlet and a radial passage connecting both said passages.

R. DÉTREZ.

REFERENCES CITED

The following references are of record in the file of this patent:

UNITED STATES PATENTS

| Number | Name | Date |
|---|---|---|
| 1,519,670 | Danstrup | Dec. 16, 1924 |
| 1,590,558 | Stenhouse | June 27, 1926 |
| 2,030,513 | Hapgood | Feb. 11, 1936 |
| 2,174,395 | Aikman | Sept. 26, 1939 |
| 2,186,657 | Saussure | Jan. 9, 1940 |

FOREIGN PATENTS

| Number | Country | Date |
|---|---|---|
| 22,961 | Great Britain | Oct. 28, 1908 |
| 646,259 | France | July 10, 1928 |